March 24, 1964 J. R. GEDDES 3,126,008

DATA STORAGE ACCESS MECHANISM

Filed Feb. 16, 1959 4 Sheets-Sheet 1

INVENTOR.
JAY R. GEDDES

BY Baylor G. Riddell
ATTORNEY

March 24, 1964 J. R. GEDDES 3,126,008

DATA STORAGE ACCESS MECHANISM

Filed Feb. 16, 1959 4 Sheets-Sheet 2

DATA STORAGE ACCESS MECHANISM

Filed Feb. 16, 1959 4 Sheets-Sheet 4

United States Patent Office 3,126,008
Patented Mar. 24, 1964

3,126,008

DATA STORAGE ACCESS MECHANISM

Jay R. Geddes, Campbell, Calif., assignor to International Business Machines Corporation, New York, N.Y., a corporation of New York Filed Feb. 16, 1959, Ser. No. 793,542
5 Claims. (Cl. 129—16.1)

This invention relates to data processing machines utilizing closely stored data-bearing elements such as short lengths of photographic or magnetic tapes, wires, or discs, etc. More particularly, the present invention relates to a method and apparatus for segregating out a selected one of a plurality of such closely stored elements.

In regard to data processing machines in general, a key consideration governing their success is found in their ability to store vast amounts of information in a relatively small space. Therefore, manufacturers of these machines have continually sought to increase their storage capacity while decreasing the space occupied by the devices. The foregoing objective has presently initiated a tread towards the storing of information on a large number of individual short lengths of tape, any one of which may be partially withdrawn from storage, processed and returned to its proper place within the storage by a suitable access mechanism. Where the strips are extremely thin, for example, on the order of .006 inch, and where also a number of them are arranged on end in a closely packed arrangement, it will be readily appreciated that the positioning of an access mechanism to locate, withdraw and replace any selected one of these strips from storage becomes a substantial problem.

In the prior art, storage density has been increased by closely packing tapes in face-to-face contact. In such an arrangement, each strip has been provided with an extending or protruding tab positioned in distinctive alignment with respect to the other tabs to provide a sort of "stairstep" arrangement which aids in the selection of a particular strip in the storage. In such an arrangement, when a selected strip is to be withdrawn from storage for processing, a suitable strip pickup device is positioned and arranged to engage a selected tab. The tape is withdrawn by pulling on the tab itself. This necessarily places considerable strain upon the tab. Further, unless the strips are placed in individual guideways (in which case they would not be in facial contact with each other and hence storage density would necessarily be sacrificed to some extent), the bottom end of each strip has, in the past, had to remain inserted in the storage to permit it to be replaced in its proper position since, if a strip were completely removed from storage, there would be no way to "mark the place" from which it had been withdrawn. Thus, the means for processing the tapes had to be arranged to service each tape at its assigned storage position during its outward (or inward) movement from storage.

The present invention, however, provides an entirely new concept in the segregation and isolation of tape strips. Briefly stated, the present invention accomplishes this segregation by the method of moving all strips located in front of a selected strip in a first direction away from the selected strip while also moving all the strips located in back of the selected strip in a direction opposite to the first direction to leave the selected strip standing alone between the strips thus moved, thereby facilitating the entry of a suitable retrieval mechanism to engage the isolated strip.

Therefore, it is an object of this invention to provide an improved method for facilitating strip retrieval in a data storage arrangement.

Further, according to the present invention the tabs are merely used to segregate a selected strip to be seized, the actual gripping of the strip being arranged to occur below the weaker tab portion, although obviously the tab portion itself could be seized if desired. Further, the present invention, after having segregated the proper strip by the method described above, holds those strips apart which are adjacent the selected strip until the withdrawn strip has been replaced.

Therefore, it is another object of the present invention to provide a tape strip segregating device wherein the tabs are primarily used for isolating a selected tape.

It is an additional object of the present invention to provide a strip segregating device which "marks the place" from which a selected tape has been completely and entirely withdrawn in order to facilitate its return to storage.

Since the present invention allows tape strips to be entirely withdrawn from the denser storage array which utilizes strips packed in face-to-face contact, it permits them to be more easily and quickly processed, i.e., "written" upon, "read" and checked, than when they are restricted to their assigned location within the storage. They may, for example, be completely and entirely withdrawn from storage and wrapped upon a rotating drum for processing in the usual manner of systems employing magnetic data processing drums.

It is, consequently, still a further object of the present invention to provide a strip segregating device wherein thin, flexible tape strips may be completely withdrawn from and replaced within a contact-packed strip storage array to enable the strips to be more readily processed.

By employing the concept of the present method of strip segregation, the strip gripping device may be made considerably larger than where it is used to grip only the tab itself, or in the alternative, a smaller strip seizing device is permitted to go deeper into the storage array by the method of the present invention in order to seize the strip further down from the top. Thus, the freedom of choice as to types of retrieving devices is substantially increased.

Therefore, a still further object of the present invention is the provision of a method and apparatus which permits a strip to be gripped further down from its top.

Other objects of the invention will be pointed out in the following description and claims and illustrated in the accompanying drawings which disclose, by way of example, the principle of the invention and the best mode which has been contemplated of applying that principle.

In the drawings:

In FIG. 1B the tops of the tab portions have been darkened for ease of recognition.

In FIG. 2A the tab tops have been darkened as in FIG. 1B, for ease of recognition.

FIGS. 5 through 8 schematically show the picking and replacing of a tape strip.

Figure 9:
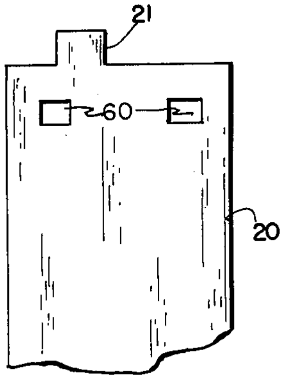

FIG. 9 shows a tape strip wherein its index tab is utilized only to segregate strips and wherein windows are placed down from the tab, in the body of the tape itself, to reduce wear on the tab.

Figure 10:
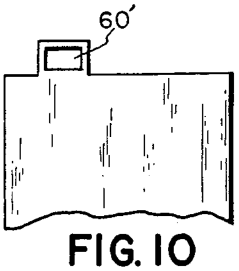

FIG. 10 shows an alternative tape wherein the tab functions both to segregate and engage a pickup head.

Figures 11, 12, 13:
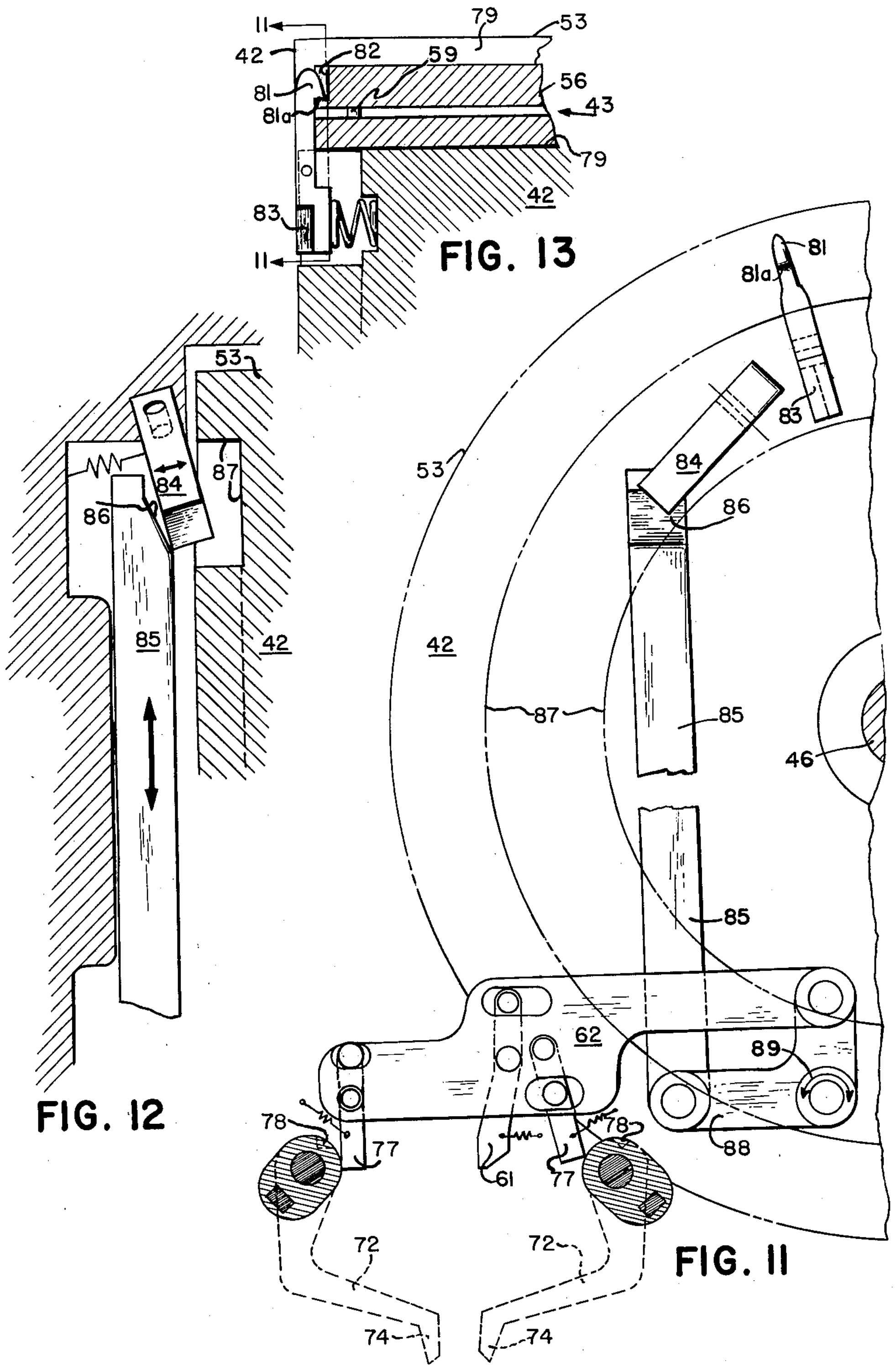

FIG. 11 is a front elevation view showing a cam-actuated linkage for locking the strip separator arms during processing of a withdrawn tape strip.

FIG. 12 is a side elevation view of a portion of FIG. 11.

FIG. 13 is a section view of the pickup head in position as latched to a drum.

Figure 1B:
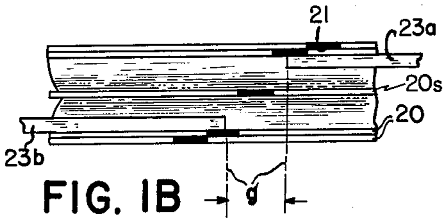
FIGS. 1A and 1B are perspective and plan views respectively of a plurality of data-bearing tape strips stored in contact relation in a group, and illustrate in its simplest form the invention as described above.
Figure 1A:
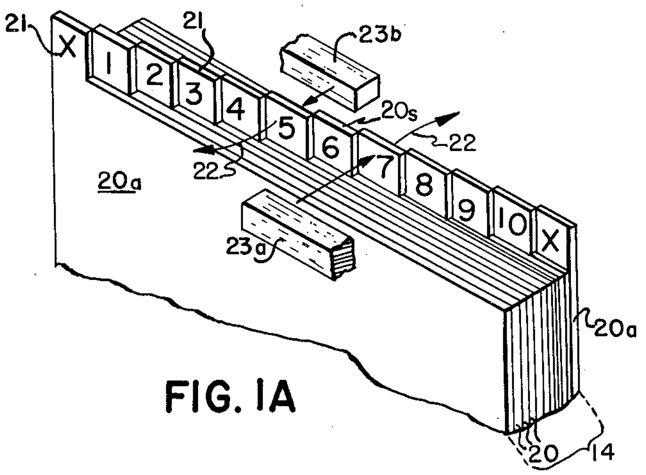

Referring to the drawings, and particularly to FIG. 1A, the method of segregating one of a number of data bearing strips 20 is thereshown. A number of thin, flexible tape strips 20 are arranged in a group 14 in face-to-face contacting relation between a pair of thin, flexible dividing strips 20*a*. Each of strips 20 and 20*a* are provided with an upwardly projecting index portion 21, each of which bears a number from "1" through "10" for ease of illustration. According to the invention, to segregate strip "6," adjacent strips "5" and "7" are moved away therefrom. This action may be effected by a pair of oppositely driven members 23*a* and 23*b* arranged with a gap "*g*" therebetween which is positionable to select any one of portions 21. Other suitable means, such as for example, a pair of directed air jets or suctions acting to move adjacent strips away from a selected strip may achieve the same result. Thus, there need not necessarily be engagement between a physical member and portions 21 to achieve the requisite motion of strips 20, the important thing being merely that the adjacent strips are moved away by some means shown only as arrows 22.

Figure 2:
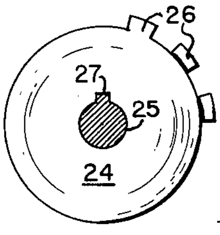
FIGS. 2 and 2A show a front and side elevation view respectively of an alternative embodiment employing discs slidably mounted on and keyed to a common shaft.
Figure 2A:
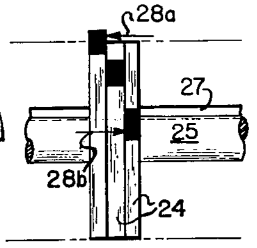

In the embodiment shown in FIGS. 2 and 2A this principle has been applied to a number of data-bearing discs 24 all keyed to a common shaft 25 and slidable thereon with respect to each other. Each of discs 24 is provided with a tab portion 26 distinctively oriented with respect to all other tabs 26 and maintained in such orientation by a key 27 integral with shaft 25. Shaft 25 may or may not be rotated depending upon the mode of its utilization. In FIG. 2A oppositely acting forces applied against tabs 26 are represented by arrows 28*a* and 28*b*.

Figure 3:
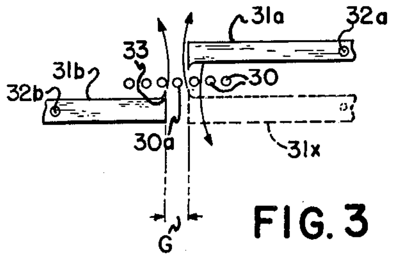
FIG. 3 is a plan view showing the method of segregating a data-bearing element as applied to elongated magnetizable wires.

Finally, in FIG. 3, the principle of the present invention is shown utilizing elongated magnetizable wires 30. Wires 30 are not provided with any tabs, but are merely bent over and away from a selected wire 30*a* by the opposed action of two arms 31*a* and 31*b*. Arms 31 may either act in a straight line or, as shown in FIG. 3, be arranged to be driven in an arc about an axis 32*a* and 32*b* respectively, so as to spread wires 30 apart in two directions to simplify replacing of a selected wire 30*a* positioned in gap "G." To prevent wires 30 from slipping off the ends of arms 31, the leading edge of each arm 31 has been provided with an arcuate lip 33 which conforms substantially to the wires 30 employed. Further, it is to be noted that arms 31 need not necessarily act in opposite directions to effect the foregoing segregation. To illustrate this, arm 31*a* has been shown in invisible lines and designated 31*x* in an alternative position on the same side of wires 30 with arm 31*b*.

Having in mind the foregoing general description, a specific preferred embodiment will now be described in detail below.

*Drum and Pickup Assembly*

Figures 1, 4:
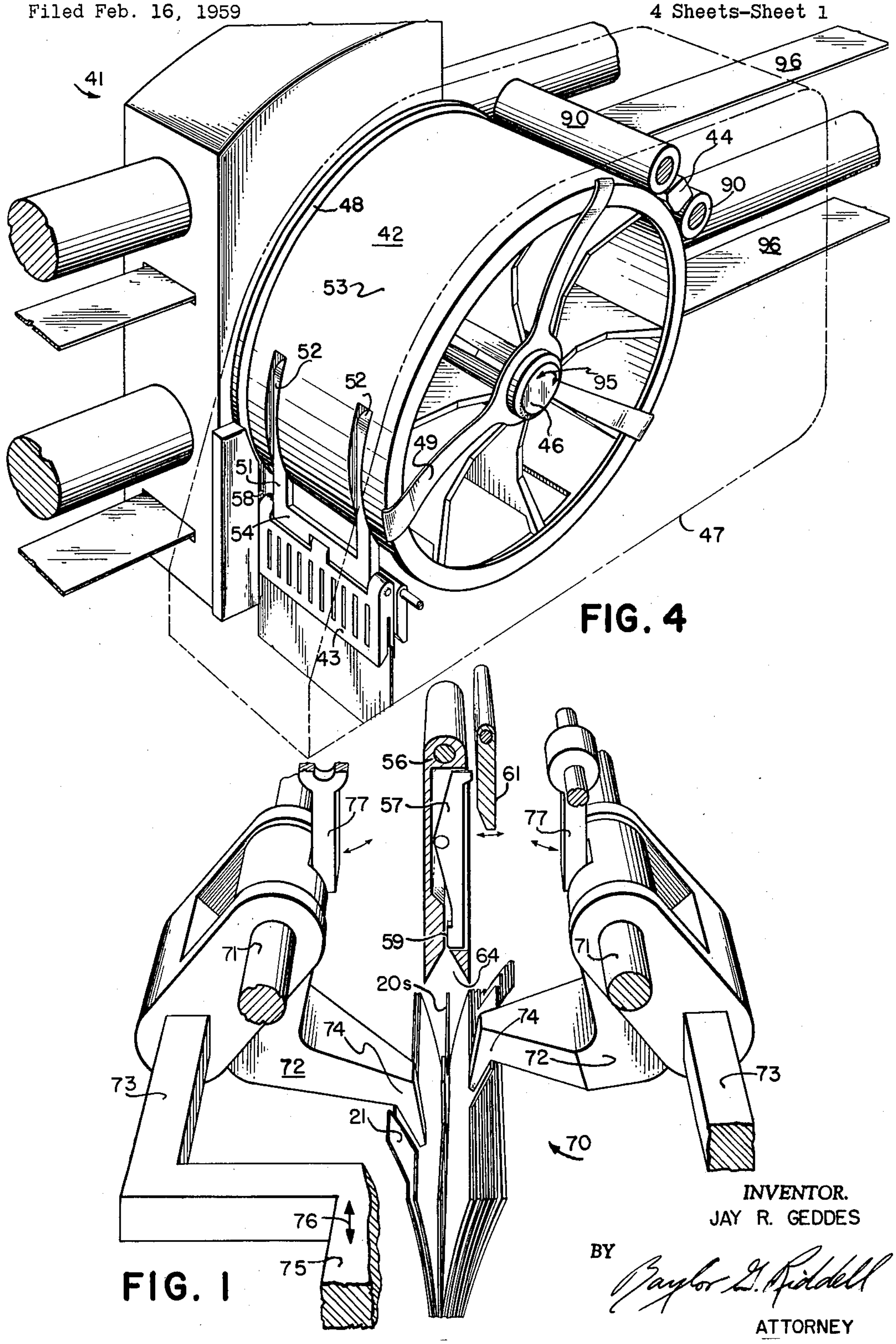
FIG. 1 is a perspective view of the tape segregating apparatus used in the embodiment shown.
FIG. 4 is a perspective view of a carriage assembly for employing the structure of FIG. 1.

With reference to FIG. 4, there is provided a read-write station designated generally by arrow 41 which comprises a rotatable drum member 42, a pickup head assembly 43 carried by drum 42 for picking a selected tape strip 20 from a group 14 of ten strips therebeneath, wrapping it on drum 42 and returning it to its proper place within the group. The read-write transducer unit 44 is also provided and mounted in data transferring relationship to strip 20 when it is wrapped about drum 42. Drum 42 is mounted on a rotatable shaft 46 which is disposed in suitable bearings (not shown) in a housing 47 provided for read-write station 41, housing 47 being shown only in phantom lines in FIG. 4 for purposes of clarity. Drum 42 is provided with a single circumferential flange 48 which acts as an accurate edge for referencing a strip 20 axially of drum 42. Suitable biasing means may be provided for urging a strip 20 to this reference edge. As shown, this biasing means comprises a spider-type leaf spring 49 which engages the long edge of a strip 20 as it is being wrapped on drum 42.

Drum 42 is further provided with a portion of its circumferential surface recessed or cut away to allow assembly 43 to be received therein and held below the drum surface 53 during rotation thereof. Assembly 53 as shown in FIG. 4, has a U-shaped member 51 whose arms 52 are mounted in drum 42 for swinging movement about an axis 45*x* which is disposed parallel to drum shaft 46 and radially inward of surface 53. Attached to a base portion 54 of member 51 is a pickup body 56 which carries a pair of latch members 57 (best seen in FIG. 1) mounted for rocking movement relative to pickup body 56. Body 56 is further arranged parallel to the top edge of strips 20 and extends substantially the width of strips 20. Strips 20 are guided in a vertical movement by two suitable guides 58, only one of which is shown, disposed in housing 47. Latch members 57 are each provided with a single tooth 59 which is arranged to engage one of a pair of windows 60 in the upper portion of each strip 20 (best seen in FIG. 9). Windows 60 may be placed directly in tabs 21 (as shown in FIG. 10) where it is desired that tab 21 shall act to both segregate and withdraw a selected strip 20. Members 57 are spring-biased so that each tooth 59 cooperates with a portion of the pickup body so as to positively engage windows 60. A spring-biased, pivotally mounted, strip release bar 61 actuated by a cam plate 62 is also provided for releasing latch members 57 as explained below.

Assembly 43, when in its "ready" position, i.e., closely adjacent the tops of strips 20, lies substantially parallel to the plane of strips 20 and disposed in a strip picking path defined by guides 58. In this instance, the strip picking path is substantially straight and tangent to drum 42. The bottom edge of pickup body 56 adjacent the top edge of strips 20 is provided with a V-shaped slot or throat 64 for guiding a selected strip 20 into engagement with teeth 59. The spread of throat 64 in the illustrated arrangement is determined by the thickness of the group 14 (FIG. 1A), in other words, the thickness of ten strips plus two dividers 20*a*, to eliminate the need for fine positioning of strip segregating assembly, designated generally by arrow 70, in a direction normal to the plane of strips 20.

*Strip Segregating Assembly*

Strip segregating assembly 70, as shown in FIG. 1, includes a pair of stationary guide rods 71 which, in the present embodiment, are fixedly attached to housing 47 of read-write station 41. Rods 71 run parallel to shaft 46 substantially parallel with the upper edge of strips 20. Rods 71 are spaced apart sufficiently to allow assembly 43 to pass therebetween. A separator arm 72 is slidably mounted on each rod 71 for movement therealong. The distal ends 74 of arms 72 are offset relative to each other to provide a gap "*g*" therebetween (FIG. 1B) somewhat wider than one tab width. The optimum degree of offset between ends 74, as shown in FIG. 1B, is two tab widths with gap "*g*" centered on the tab 21 of a selected strip 20*s*. This spacing permits the greatest possible positioning error of gap "*g*" without picking an erroneous strip, i.e., gap "*g*" may be positioned within plus or minus one-half the width of one tab 21 and still segregate the correct strip 20*s*. Arms 72 are moved together along rods 71 by means of a yoke 73 shown in partial section in FIG. 1. Yoke 73 is provided with a tongue 75 attached to a suitable positioning means represented in FIG. 1 schematically by arrow 76. Any suitable mechanical, electrical or hydraulic positioning device known in the art may be employed for means 75. For example, the positioning device disclosed in U.S. Letters Patent 2,197,867, may be employed for this discrete positioning of yoke 73.

Figure 5:
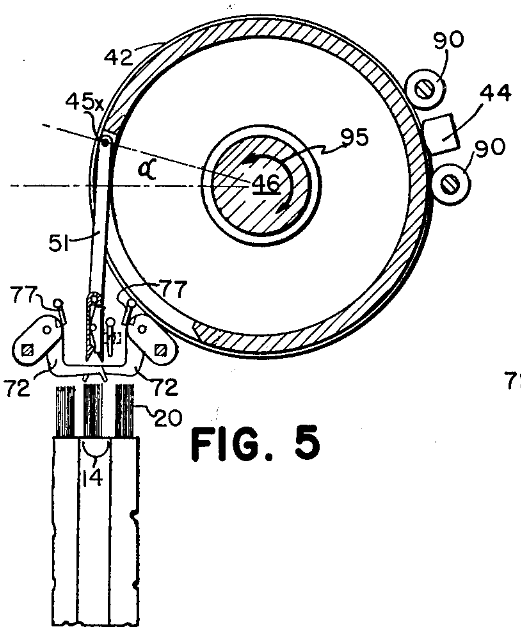
Figure 6:
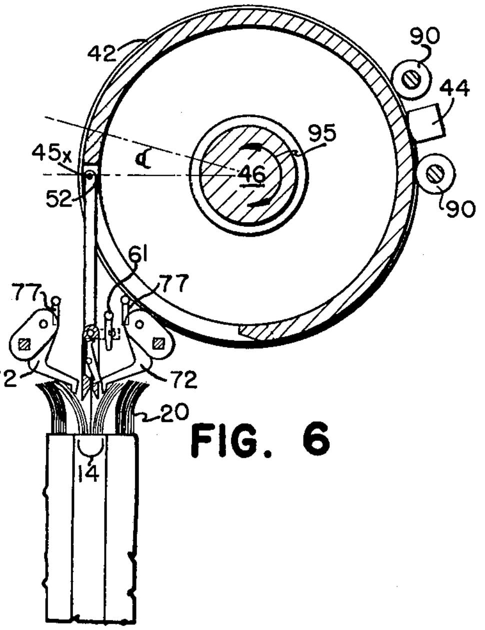

Arms 72 are also mounted for pivotal movement in opposite directions about their respective rods 71 and are biased to the position shown in FIG. 5 wherein ends 74 overlap and lie on opposite sides of the vertical plane containing assembly 43. The degree of overlap between ends 74 is sufficient to segregate any one of strips 20 without applying any fine positioning to assembly 70 in a direction normal to the plane of strips 20, as referred to above with respect to throat 64. Ends 74 are further aligned so that rotation of arms 72 in the downward direction causes ends 74 to engage tab portions 21 of the strips adjacent a selected strip 20*s*, thereby bending the upper portion of strips 20 away from the selected strip thereby presenting only one strip 20*s* standing alone to be received in throat 64 of body 56. Downward pivotal movement of arms 72 may be obtained in response to the downward thrust of body 56 under counterclockwise rotation of drum 42, as shown in FIG. 6, or by a separate driving means provided as desired.

*Arm Locking Linkage*

In order to facilitate replacement of a strip 20 in its group 14 after it has been withdrawn and processed, each arm 72 is arranged to coact with a locking pin 77 biased to engage a notch 78 formed in the shoulder portion of arms 72. As arms 72 are caused to rotate downwardly by the passage of assembly 43 therebetween, pins 77 are urged into notches 78 to lock arms 72 in their open positions. Arms 72 remain locked open until the strip selected has been returned to its group 14. At this time pins 77 are released by the action of cam plate 62 (FIG. 11).

There is further provided means for securing and releasing assembly 43 from its position in a recessed portion 79 of drum 42 (FIG. 13) during rotation thereof to prevent centrifugal force from acting thereon during processing. Means for effecting this is shown in FIGS. 11 through 13, and generally comprises a spring-urged retaining catch 81 having a lip portion 81*a* for engaging a detent 82 in the side of body 56. The bottom of catch 81 is formed with a tapered surface 83 for engagement with an inclinable cam 84 pivotally mounted to be forced outwardly into the path of surface 83 as catch 81 travels with drum 42. For actuating cam 84 there has been provided an unlocking lever 85 having a wedge-shaped upper end portion 86. Lever 85 is coupled at its lower end to a bell-crank 88 which can be driven a predetermined distance both clockwise and counterclockwise from a neutral position (as shown in FIG. 11) by any suitable means (represented in FIG. 11 by arrow 89) which is capable of performing this three position function, such as a three position solenoid acting through a rack and pinion to produce rotational motion on bell-crank 88. As shown in the drawings, lever 85 has been severed and its upper end placed so as to represent the clockwise movement of bell-crank 88 whereas the lower portion of bell-crank 88 as shown in FIG. 11 is in its neutral position. Bell-crank 88 is also coupled to cam plate 62 so as to be driven by means 89 to a lefthand, neutral and righthand position, as shown in FIG. 11. Cam 62 is further arranged to pivotally actuate strip release bar 61 and locking pins 77.

In order for a selected strip 20*s* to be picked, wrapped on drum 42 and returned to its group 14, it is necessary to rotate drum 42 in both directions in a predetermined sequence. As mentioned previously, the home or "ready" position of drum 42 and assembly 43 is illustrated in FIG. 5 wherein assembly 43 is guided in the plane of strips 20 along a path which is substantially tangent to surface 53 of drum 42.

Figure 7:
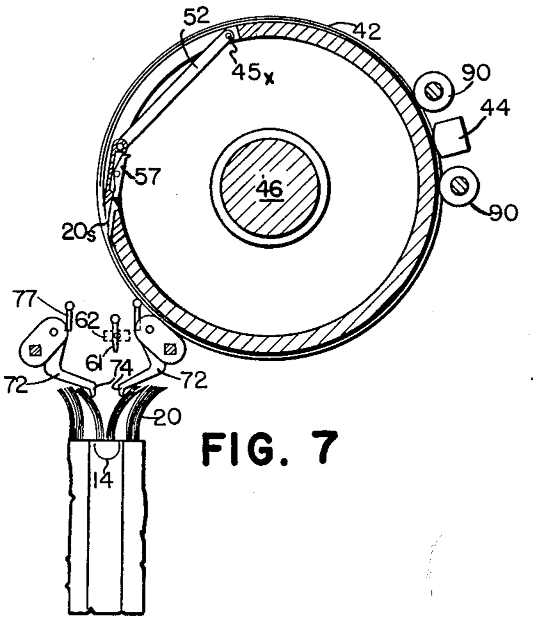
Figure 8:
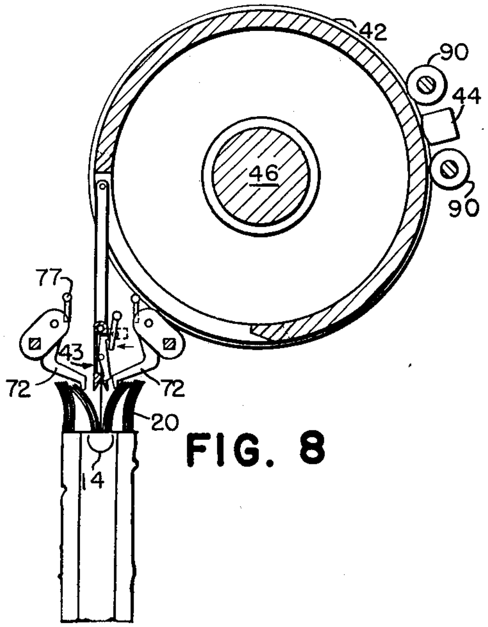

In picking strip 20*s*, drum 42 is first rotated counterclockwise through a predetermined angle alpha ($\alpha$) to cause assembly 43 to latch onto a selected strip 20*s* by forcing its upper edge between the leading edge of teeth 59, which preferably should be slightly tapered, and body 56. This point in the cycle of operation is shown in FIG. 6. Rotation of drum 42 is then reversed to a clockwise rotation which causes strip 20*s* to be retracted from its group 14 and wrapped on drum 42. The circumference of drum 42 is slightly less than the length of a strip so that the end of the strip overlaps the engaged edge of the strip 20*s*. This point in the cycle is substantially shown in FIG. 7. Sutable strip guides in the form of rollers 90 may be provided adjacent drum 42 to insure compliance of strip 20 on drum surface 53 during processing thereof by unit 44. With a selected strip on drum 42 it may be rotated clockwise for any desired number of complete revolutions commensurate with the type of processing desired. Upon completion of its processing, strip 20*s* is returned to group 14 by again rotating drum 42 counterclockwise. This rotation should begin at a predetermined angular location substantially as shown in FIG. 7 which corresponds to the positioning of the trailing end of strip 20*s* being positoned adjacent the upper ends of guides 58. Rotation of drum 42 counterclockwise from the position as shown in FIG. 7 returns strip 20*s* to its original position in its group 14. As assembly 43 passes downwardly past bar 41, members 57 are tripped, as explained below, to release teeth 59 from windows 60. After the strip 20*s* has been replaced in storage, rotation of drum 52 is again reversed so that it rotates clockwise through the angle alpha ($\alpha$) to the "ready" position, shown in FIG. 5, whereupon drum 42 is stopped.

The means for rotating drum 42 to provide the desired operation described above and illustrated in FIGS. 5 through 8 is shown diagrammatically simply by the arrow 95 shown on the end of shaft 46. Means 95 for driving drum 42 may be any suitable means adaptable to the functions above described. For example, one suitable arrangement is disclosed in detail in copending application Serial No. 733,902 filed May 8, 1958 which is assigned to the same assignee as the present invention and which is now U.S. Patent 2,873,725. Hence, a detailed description of the subject driving apparatus 95 is not included herein. However, means 95 may be described briefly as a fluid motor utilizing a multi-vane rotor and having means for arresting a selected one of its vanes at a predetermined rotational position by exhausting fluid from the rotor chamber from opposite sides of a selected vane representing the desired rotational arresting position. Means 95 referred to in the above patent may be connected directly to shaft 46 or shaft 46 may be driven by means 95 via an endless belt arrangement shown in FIG. 4 as belt 96.

*Operation*

One complete cycle of operation for segregating, withdrawing and replacing a particular strip 20*s* will now be described in order to provide a complete understanding of the operation and sequence of the embodiment disclosed. Means 76 is conditioned to place gap "*g*" in line with the tab 21 of a selected strip 20*s*. Starting from the "ready" position, shown in FIG. 5, drum 42 is rotated counterclockwise by means 95 so as to drive assembly 43 downwardly. As body 56 forces arms 72 out of its way, ends 74 are driven into engagement with tabs 21 of those strips 20 adjacent selected strip 20*s*. As body 56 passes between arms 72, cam 62 is in its neutral position as shown in FIG. 11. Therefore, bar 61 and pins 77 are free to act under the biasing influence of their springs. As arms 72 move downwardly pins 77 lock into notches 78 to keep arms 72 open. Finally, as throat 44 passes over strip 20*s*, the upper edge of strip 20*s* forces its way under teeth 59 until they close on windows 60.

After having firmly engaged windows 60, assembly 43 is withdrawn upwardly by driving means 95 clockwise. While drum 43 is driven in this clockwise direction and after the bottom of strip 20s has left group 14, processing of strip 20s is commenced by unit 44. After all processing of strip 20s has been completed, means 95 is actuated to arrest drum 42 substantially in the position shown in FIG. 7. At this time, while drum 42 is stopped, cam 62 is driven to the right by the clockwise rotation of bellcrank 88 under the control of means 89. This rightward movement of cam 62 drives the lower end of bar 61 to the left placing it in position to release strip 20s as latch members 57 pass thereacross (see FIG. 1). Further, the rightward movement of cam 62 serves to positively lock pins 77 firmly in place in notches 78 as well as to drive unlocking lever 85 upwardly to the position best shown in FIG. 12. The upward movement of lever 85 forces portion 86 thereof under cam 84 causing it to extend out into an annular way 87 formed in the side of drum 42. As catch 81 (riding with drum 42) approaches cam 84) surface 83 rides up over cam 84 forcing its lower end inwardly of drum 42 thereby moving lip 81a to the left as shown in FIG. 13 to disengage body 56. Thus assembly 43 will be free of drum surface 53 during its subsequent counterclockwise movement. After having stopped drum 42, as shown in FIG. 7, means 95 is reversed to drive counterclockwise to return strip 20s to group 14. As the upper ends of members 57 traverse bar 61, teeth 59 disengage from windows 60 to leave strip 20s in group 14. Reversing drum 42 then retracts assembly 43 to its "ready" position.

After assembly 43 has been returned to its "ready" position and throat 64 is clear of arms 72, substantially as shown in FIG. 5, cam 62 is driven by means 89 operating counterclockwise to its full left position. This movement of cam 62 pivots pins 77 out of detents 78 to allow arms 72 to pivot upwardly under the action of spring bias. After pins 77 have been unlocked cam 62 is returned by means 89 to its neutral position and a subsequent cycle of operation is ready to commence. Thus, if a different strip is to be withdrawn during the following cycle, it will commence by positioning yoke 73 to place gap "*g*" in line with the proper tab 21.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A tape storage arrangement including:

a plurality of short lengths of tape stored in a group in face-to-face relation wherein the tapes are each provided with a tab portion extending therefrom and sequentially offset from the tab portions of the other tapes from the first to the last tape of said group; and means for displacing tapes on both sides of a selected tape away from said selected tape to expose a substantial surface area of the selected tape, said means including:

a pair of members arranged to move in opposite directions toward and away from each other in a direction perpendicular to the planes of said tapes, said members being spaced apart in a direction normal to their direction of movement to provide a gap therebetween, the width of said gap being greater than the width of the tab portion of any one tape and less than the spacing between the tab portions of the tapes on each side of said one tape, thereby providing clearance for the tab portion of any selected tape;

means for positioning said members to align said gap with the one of said tab portions belonging to said selected tape; and means for moving said members in opposite directions into contact with the tab portions on either side of the selected tab portion to displace the tapes on both sides of said selected tape away from said selected tape.

2. A strip storage arrangement including:

a device for segregating a group of closely packed data bearing strips, each having a distinctively extended portion at their upper edge offset sequentially from those of adjacent strips from the first to the last strip of said group; and means for displacing strips on both sides of a selected strip to expose a substantial surface area of the selected strip, said means including:

a pair of arm members pivotally mounted above the strips for movement toward and away from each other in a direction perpendicular to the planes of said strips, the distal ends of said members being spaced apart in a direction perpendicular to the direction of movement of said distal ends to form a gap therebetween, the width of said gap being greater than the width of the distinctively extended portion of any one strip and less than the spacing between the distinctively extended portions of those strips on each side of said one strip, thereby providing clearance for the distinctively extended portion of a selected strip;

means for positioning said members to align said gap with the one of said distinctively extended portions belonging to said selected strip; and means for rotating said members in opposite directions into engagement with the distinctively extended portions of the strips adjacent both sides of the selected strip to displace said adjacent strips, thereby leaving said selected strip segregated from all other strips.

3. A data storage arrangement including:

a plurality of planar storage elements stored in face-to-face relation wherein each element has a predetermined portion of essentially the same width offset sequentially from similar portions of adjacent elements from the first to the last element of said plurality of said elements;

a device for displacing elements on both sides of a selected one of said elements to expose a substantial surface area of the selected element, said device including:

a pair of members mounted to move toward and away from each other in a direction to cross the planes of said elements, and into engagement with the predetermined portions of said elements, said members being spaced apart in a direction perpendicular to the direction of movement of said members to provide a gap between said members, the width of said gap being greater than the width of the predetermined portion of any one element and less than the spacing between the predetermined portions of the elements on each side of said one element;

means for positioning said members to align said gap with the predetermined portion of a selected one of said elements to avoid engaging the latter said predetermined portion by said members; and means for moving said members in opposite directions away from each other into engagement with at least the predetermined portions of said elements adjacent both sides of said selected element, whereby said selected element is substantially isolated to facilitate engagement therewith by a pickup device.

4. A data storage apparatus comprising:

a plurality of data bearing elements, each of said elements having a portion of the same width distinctively exposed and spaced sequentially with respect to the other in an ordered manner from the first to the last element of each grouping of said plurality of said elements;

means supporting said element in closely packed relation, mechanical means for displacing elements on both sides of a selected one of said elements to expose a substantial surface area of the selected element, said mechanical means including:

a pair of members mounted to move in opposite directions along separate spaced apart parallel paths into engagement with any of said portions lying along their respective paths, the space between said paths defining a gap perpendicular to said paths, the width of said gap being greater than the width of any one of said distinctively exposed portions of said elements and less than the spacing between the distinctively exposed portions on each side of said one distinctively exposed portion, allowing said members to pass free of the distinctively exposed portion of said selected one of said elements;

means connected to the members to position the gap between the paths and said distinctively exposed portion of said selected element;

actuating means connected to the members to move said members in said opposite directions into engagement with those distinctively exposed portions lying in their respective paths and adjacent said distinctively exposed portion of said selected element to displace said elements adjacent both sides of said selected element; and seizing means to engage said selected element.

5. A data storage arrangement comprising:

a plurality of short lengths of tape supported in face-to-face relation, each tape having a portion of the same width distinctively exposed and spaced sequentially with respect to the others from the first to the last element of said plurality of said elements;

a tape pick-up device for completely withdrawing any one of said tapes;

a tape segregating device for exposing a substantial surface area of a selected tape, said device including:

a pair of mechanical members pivotally mounted adjacent the tapes to move in opposite directions along separate spaced apart parallel paths, said paths being perpendicular to the planes of said tapes, said spacing between said members forming a gap therebetween, the width of said gap being greater than the width of the distinctively extended portion of any one tape and less than the spacing between the distinctively extended portions of the tapes immediately adjacent both sides of said one tape, said gap being sufficient to provide clearance for the distinctively offset portion of any one of said tapes;

positioning means connected to the members to align said gap with a selected one of said distinctively offset portions, said members thereby being aligned to be capable of being moved into engagement with at least those of said portions immediately adjacent the selected portion aligned with said gap;

actuating means connected to the members to move said members and their said opposite directions to displace the tapes on both sides of said selected tape away from said selected tape to facilitate withdrawal of said selected tape from said group by said pick-up device; and stop means positioned adjacent said members to lock said members and retain the displaced tapes in their displaced condition until said selected tape has been returned to said group by said pick-up device.

References Cited in the file of this patent

UNITED STATES PATENTS

| | | |
|---|---|---|
| 348,858 | Moock | Sept. 7, 1886 |
| 624,597 | Williams | May 9, 1899 |
| 1,149,310 | Von Phul | Aug. 10, 1915 |
| 1,490,798 | Bullock | Apr. 15, 1924 |
| 1,585,867 | Kruse | May 25, 1926 |
| 1,844,376 | Wood | Feb. 9, 1932 |
| 2,656,091 | Mathiesen | Oct. 20, 1953 |
| 2,740,210 | Hamborg | Apr. 3, 1956 |

FOREIGN PATENTS

| | | |
|---|---|---|
| 730,163 | Great Britain | May 18, 1955 |